A. L. HOLMES, Jr.
TRAILER ATTACHMENT.
APPLICATION FILED JUNE 16, 1917.

1,243,177. Patented Oct. 16, 1917.

Witnesses
Arthur F. Draper
Karl H. Butler

Inventor
Arthur L. Holmes Jr.
By
Attorneys

UNITED STATES PATENT OFFICE.

ARTHUR L. HOLMES, JR., OF DETROIT, MICHIGAN, ASSIGNOR TO MAY E. HOLMES, OF DETROIT, MICHIGAN.

TRAILER ATTACHMENT.

1,243,177.     Specification of Letters Patent.     Patented Oct. 16, 1917.

Application filed June 16, 1917. Serial No. 175,078.

*To all whom it may concern:*

Be it known that I, ARTHUR L. HOLMES, Jr., a citizen of the United States of America, residing at Detroit, in the county of Wayne and State of Michigan, have invented certain new and useful Improvements in Trailer Attachments, of which the following is a specification, reference being had therein to the accompanying drawings.

This invention relates to a tractor attachment, and has special reference to a draft appliance by which a trailer or other vehicle may be easily and quickly connected to a tractor, motor truck or power vehicle to be drawn or moved thereby.

The primary object of my invention is to furnish the frames of a tractor or motor truck with a draft appliance to which a trailer or other vehicle can be connected to have the universal movement relatively to the tractor frame, and at the same time have a degree of yieldability relatively to the tractor so as to facilitate starting and stopping, besides relieving the trailer connecting means of stresses and strains during the operation of the trailer by a tractor.

Another object of my invention is to provide trailer and tractor coupling means embodying a reciprocable member on which a trailer body or frame may have a universal movement. Besides possessing the adjustment of an ordinary fifth wheel, the trailer body or frame may rock or tilt relatively to the reciprocable member, consequently the trailer may adjust itself relatively to the tractor and this is desirable when rough and irregular ground is encountered.

A further object of my invention is to provide a trailer attachment wherein the parts are constructed with a view of reducing the cost of manufacture, and at the same time retain those features by which safety, durability and ease of assembling and installing are secured.

With such ends in view, my invention resides in the novel construction combination and arrangement of parts to be hereinafter specifically described and then claimed.

Reference will now be had to the drawings, wherein—

Figure 1:
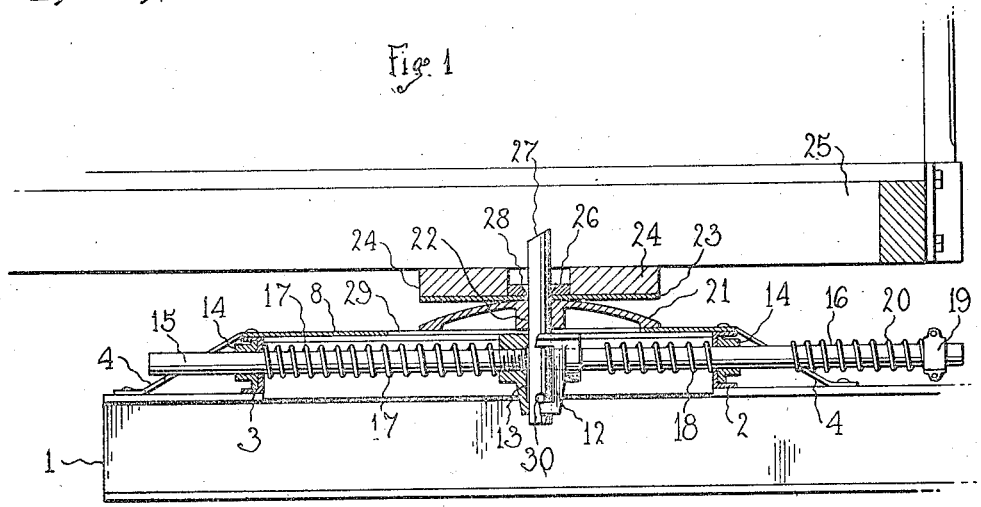
Figure 1 is a longitudinal sectional view of a trailer attachment.
Figure 2:
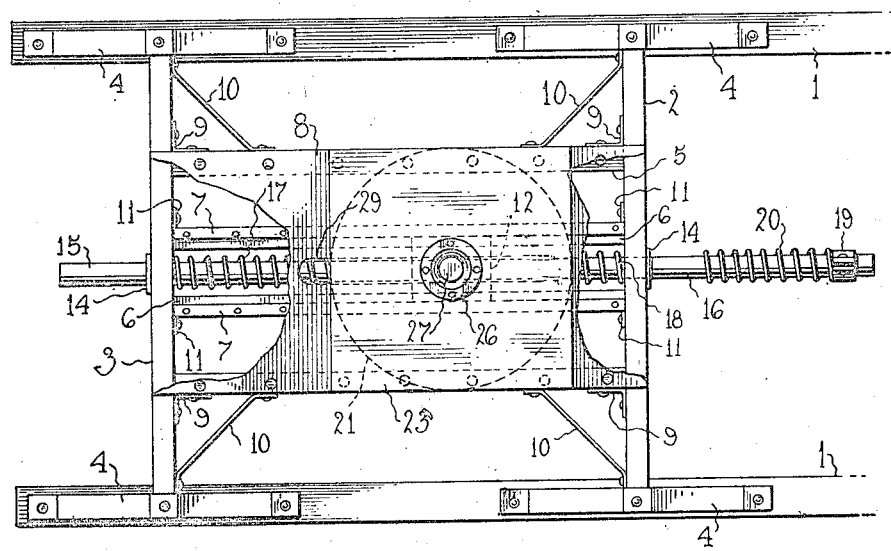
Fig. 2 is a plan of the same, partly broken away.
Figure 3:
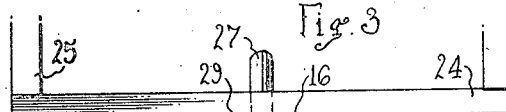
Fig. 3 is a cross sectional view of the trailer attachment.

The reference numeral 1 denotes the usual channel frame of a tractor, motor truck or power vehicle, and mounted on these frames are transverse channel members 2 and 3 having the ends thereof held by straps 4 riveted or otherwise connected to the upper lateral flanges of the frames 1, as best shown in Fig. 2. The transverse members 2 and 3 are connected by longitudinally disposed outer channel members 5 and similarly disposed inner channel members 6, the latter being set in a plane slightly below the plane of the outer members 5, so that guide strips 7 can be secured to the upper lateral flanges of the inner members 6. The guide strips 7 coöperate with the upper lateral flanges of the members 5 in supporting a plate 8 which may be riveted or otherwise connected to the outer members 5. The outer members 5 are connected to the transverse members 2 and 3 by angle brackets 9 and angle braces 10, while the inner members 6 are held by angle brackets 11.

Slidable between the inner longitudinal members 6 and resting on the upper flanges thereof between the guide strips 7 is a king pin block 12 provided with a transverse opening 13. Connected to the block 12 and extending through transverse members 2 and 3 and bearings 14 carried thereby are draw rods or bars 15 and 16 suitably connected to the block 12. Encircling the rod 15, between the member 3 and the block 12 is a coiled spring 17 and a similar spring is on the rod 16 between the member 2 and the block 12. The rod 16 extends forwardly and has a stop member 19 for a spring 20 encircling said rod.

Slidable on the plate 8 is a convexo-concave fulcrum or fifth wheel member 21 having a central opening 22 and on said fulcrum member is a wear plate 23 carried by frames or a block 24 of a trailer body or frame 25. Between the frame 24 or in said block is a center plate 26 and this plate and the bottom plate 23 are provided with openings 28 to receive a king pin or bolt 27. The king pin or bolt 27 extends through the opening 22 of the member 21, through a longitudinal slot 29 in the plate 8, and through the block 12, said king pin or bolt being held relatively to the block 12 by a transverse pin 30 extending into the opening 13 of said block.

The upper end of the king bolt 27 is beveled so that the wear or bottom plate 23 can be easily placed down over the king bolt and in this manner the trailer frame or body easily connected to the tractor frame. The wear plate 23 coöperates with the convexo-concave member 21 and the king bolt 23 in providing universal connection between the trailer and the tractor, so that besides the usual fifth wheel action, there may be a rocking movement of the forward end of the trailer relatively to the rear end of the tractor.

In operation, the initial forward movement of the tractor brings the spring 17 into action, and this spring is placed under compression when the tractor is pulling the trailer. When there is a heavy load on the trailer or considerable resistance of the trailer to move with the tractor, then the spring 20 is brought into action, to coöperate with the spring 17 in establishing a more rigid pulling connection between the tractor and the trailer. Since the springs 17 and 20 will resist the sliding or linear movements of the member 21 upon the plate 8, it is possible to utilize the expansive force of the spring and the momentum of the tractor in starting a load; the direct pull of the tractor being sufficient to maintain the trailer in motion when the tractor is started. The springs 17 and 20, however, constitute the yieldable connection between the trailer and the tractor to permit of certain retardations of the part of the trailer, relatively to the tractor, particularly when ruts or obstacles are encountered, and resisting any excessive forward movement of the trailer relatively to the tractor is a spring 18, which is also brought into action when backing the trailer.

I find that when the trailer encounters ruts or other obstacles and cannot be easily moved by the tractor that it is only necessary to start the tractor, then set the brake and as the starting movement of the tractor has placed the springs 17 and 20 under tension, the expansive force of said springs will move the trailer and then by allowing the tractor to proceed, the trailer is safely moved out of ruts or over an obstacle.

I also find that the spring 17 will permit of a tractor switching back and forth to get in a sidewise position relatively to the trailer, so that the tractor may pull at an angle to the trailer and then remove one wheel of the trailer from a difficult position, and then maneuver the tractor to another position so that the other wheel of the trailer can be removed from a difficult position. It is a distinct and important advantage in connection with my invention.

One embodiment of my invention has been illustrated, but it is to be understood that the structural elements are susceptible to such variations and modifications as fall within the scope of the appended claims.

What I claim is:—

1. Trailer coupling means for a tractor comprising a tractor plate, a member slidable on said plate, a trailer wear plate having a universal movement on said member, a king bolt extending through said wear plate, member and tractor plate, and means below said tractor plate adapted to resist longitudinal movement of said member on said tractor plate.

2. Trailer coupling means for tractors, comprising a tractor plate, a member slidable on said plate, a trailer wear plate fulcrumed on said member, a king bolt block below said tractor plate, a king bolt carried by said block and extending through said member and said wear plate, and means adapted to resist movement of said king bolt block relatively to said tractor plate.

3. The combination with a tractor, and a trailer, of means establishing driving yieldable connections between said tractor and trailer, comprising longitudinal frames on said tractor, a plate above said frames, a member slidable on said plate, a trailer wear plate fulcrumed on said member, a king bolt block slidable between said frames, a king bolt carried by said block extending through said member and said trailer wear plate, draw rods carried by said king bolt block, and springs on said draw rods adapted to resist longitudinal movement of said king bolt block relatively to said frames.

4. Trailer coupling means for tractors, comprising tractor transverse members, longitudinal members connecting said transverse members, a plate on all of said members, a convexo-concave member slidable on said plate, a trailer wear plate fulcrumed on said convexo-concave member, a king bolt block slidable between said longitudinal members, a king bolt carried by said block extending through said convexo-concave member and said trailer wear plate, draw rods carried by said king bolt block, and extending through said tractor transverse member, and springs on said draw rods adapted to be successively brought into action during the pulling of said trailer by said tractor.

In testimony whereof I affix my signature in the presence of two witnesses.

ARTHUR L. HOLMES, Jr.

Witnesses:
LEWIS E. FLANDERS,
KARL H. BUTLER.